United States Patent
Li et al.

(10) Patent No.: US 8,253,710 B2
(45) Date of Patent: Aug. 28, 2012

(54) SYSTEM AND METHOD FOR PROTECTING A RESISTIVE TOUCH PANEL OF A COMMUNICATION DEVICE

(75) Inventors: Jun Li, Shenzhen (CN); Zhong-Liang Tang, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 387 days.

(21) Appl. No.: 12/724,346

(22) Filed: Mar. 15, 2010

(65) Prior Publication Data

US 2011/0148668 A1    Jun. 23, 2011

(51) Int. Cl.
*G06F 3/041* (2006.01)

(52) U.S. Cl. ........................................ 345/173

(58) Field of Classification Search .......... 345/173–178;
341/120; 340/540
See application file for complete search history.

(56) References Cited

U.S. PATENT DOCUMENTS

| 7,250,940 B2 * | 7/2007 | Jayanetti et al. | 345/173 |
| 8,106,787 B2 * | 1/2012 | Nurmi | 340/665 |
| 2011/0248957 A1 * | 10/2011 | Park | 345/174 |

* cited by examiner

*Primary Examiner* — Brian Young
(74) *Attorney, Agent, or Firm* — Altis Law Group, Inc.

(57) ABSTRACT

A system and a method for protecting a resistive touch panel of a communication device includes setting a pressure threshold level, obtaining parameter values of the resistive touch panel and location information of the touch point and calculating the value of the touch resistance. The system and the method further includes confirming a pressure level corresponding to a range of the calculated resistance value, and outputting audio alerts using the alarm unit to prompt that the press action on the resistive touch panel is too forceful if the confirmed pressure level is not lower than the pressure threshold level.

12 Claims, 5 Drawing Sheets

SYSTEM AND METHOD FOR PROTECTING A RESISTIVE TOUCH PANEL OF A COMMUNICATION DEVICE

BACKGROUND

1. Field of the Invention

Embodiments of the present disclosure are related to protection apparatus, and in particular, to a system and method for protecting a resistive touch panel of a communication device.

2. Description of Related Art

At present, many communication devices comprise touch panels to receive touch inputs to manipulate functions of the communication devices. These touch panes can be resistive touch panels, which rely on pressure applied to the touch screen to manipulate functions. However, it is easy to unintentionally use excessive force and cause damage to a resistive touch panel.

What is needed, therefore, is an improved electronic system and method for protecting a resistive touch panel of a communication device.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of non-transitory computer-readable medium or other non-transitory computer storage device.

Figure 1:
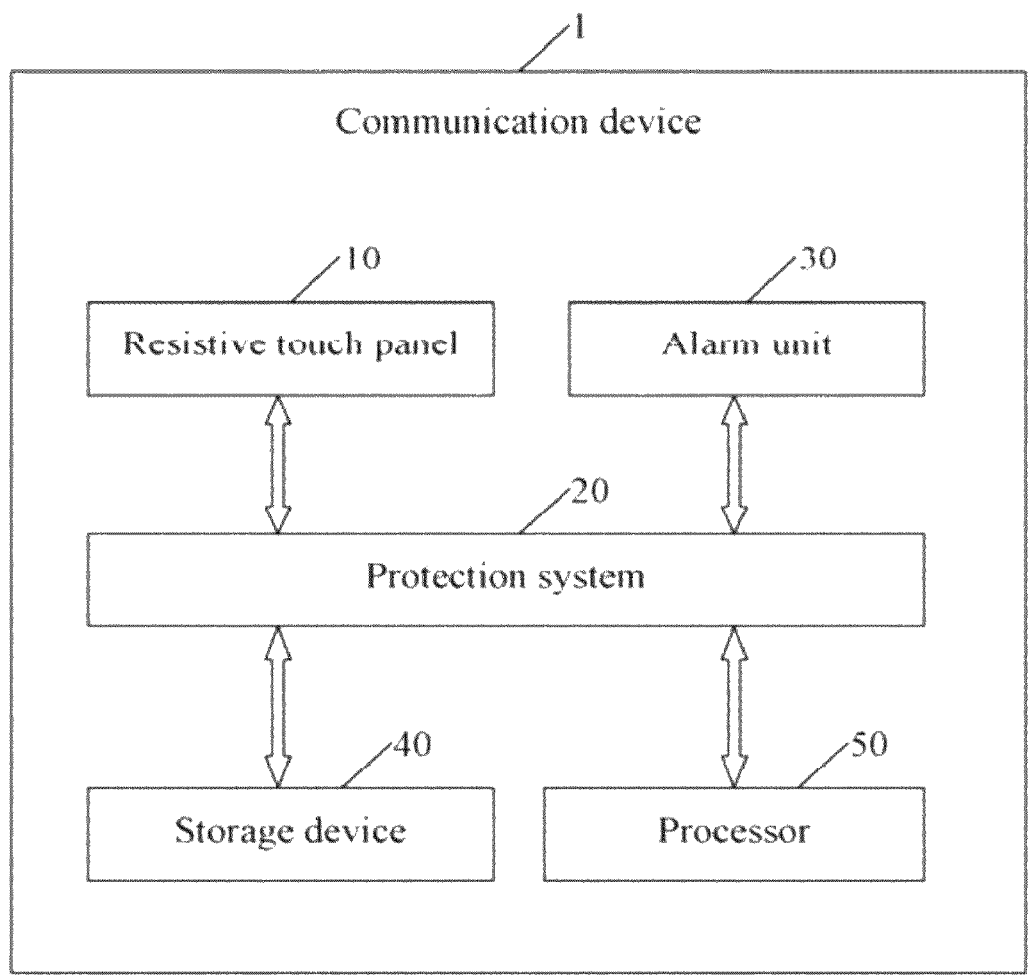
FIG. 1 is a structure diagram of one embodiment of a communication device including a protection system.

FIG. 1 is a block diagram of one embodiment of a communication device 1 including a protection system 20. The communication device 1 further includes a resistive touch panel 10 and an alarm unit 30. The protection system 20 may be used to output alerts when a user presses on the resistive touch panel 10 with excessive force, so as to protect the resistive touch panel 10 from being damaged. The alarm unit 30 may comprise a speaker to output audio alerts.

The communication device 1 further includes a storage device 40 and a processor 50. The storage device 40 may be an internal memory of the communication device 1, or an external storage card, such as a smart media (SM) card or secure digital (SD) card. The storage device 40 may store various kinds of data. The processor 50 executes one or more computerized operations of the communication device 1 and other applications, to provide the functions of the communication device 1. Depending on the embodiment, the communication device 1 may be a mobile phone, a notebook computer, a personal digital assistant, or any other communication devices.

Figure 2:
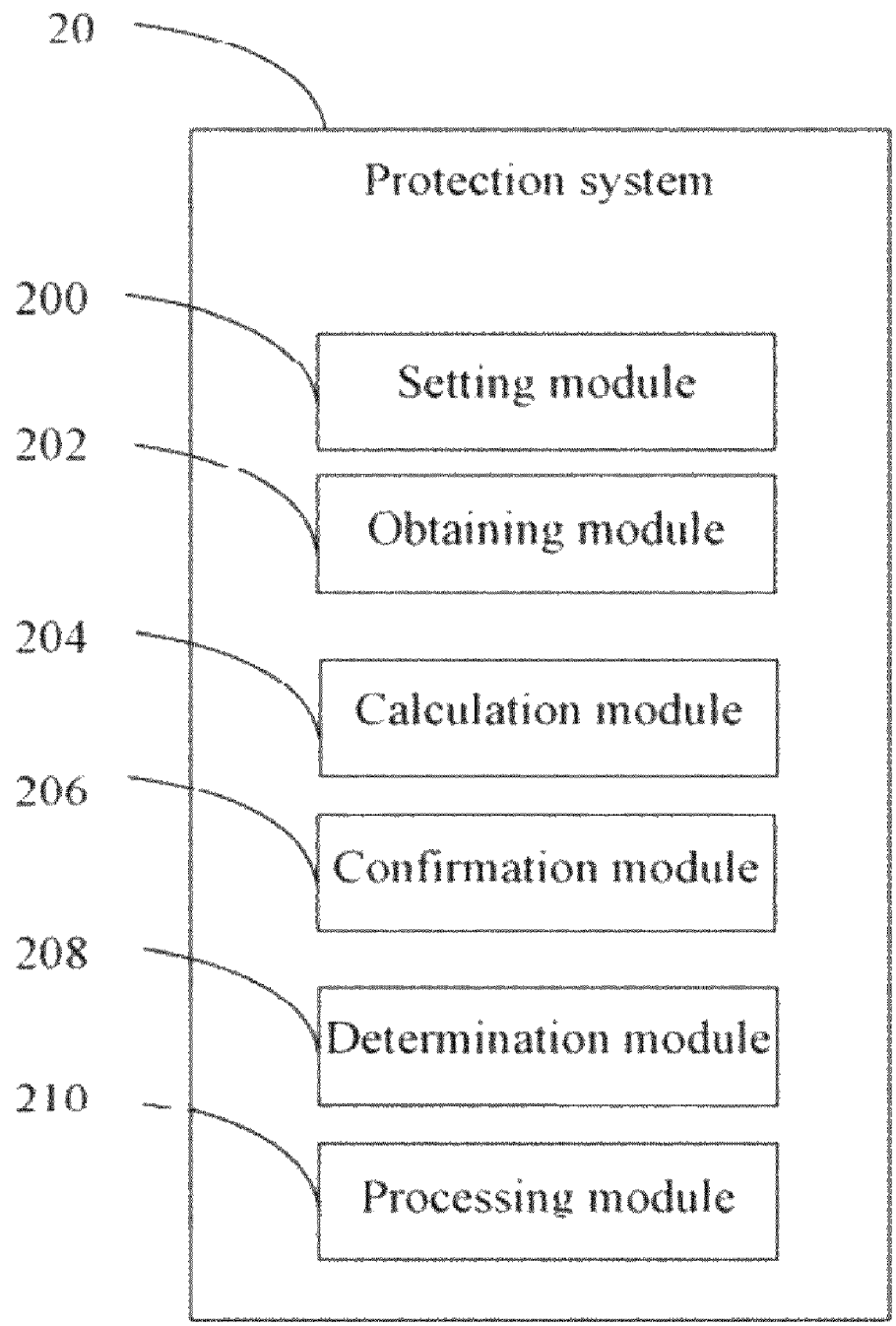
FIG. 2 is a block diagram of one embodiment of the protection system of FIG. 1.

FIG. 2 is a block diagram of one embodiment of a protection system of FIG. 1. The protection system 20 comprises a setting module 200, an obtaining module 202, a calculation module 204, a confirmation module 206, a determination module 208, and a processing module 210. The modules 200, 202, 204, 206, 208, and 210 may comprise one or more computerized codes to be executed by the processor 16 to perform one or more operations of the communication device 1. Details of these operations will be provided below.

The setting module 200 sets an audio alerts of the alarm unit 30 for the communication device 1, and a priority of the audio alerts. In one embodiment, the priority of the audio alerts may be higher than the priority of a voice prompt given in response to touch on the resistive touch panel 10, such as the beeps or vibrations used to let a user know their touch was received as input. The audio alerts may alert the user when the user presses the resistive touch panel 10 with excessive force.

The setting module 200 also sets a plurality of pressure levels of the touch panel 10, which comprise different ranges of resistance values of a touch resistance, and sets a pressure threshold level. For example, resistance values from $0\Omega$ to $200\Omega$ of the touch resistance may be divided into 10 grades, such as 0 to $20\Omega$, and $21\Omega$ to $40\Omega$, for example. The pressure levels corresponding to different ranges of resistance values may numbered such as from 1 to 10, with 10 corresponding to the range of 0 to $20\Omega$ accomplished by a touch having great force, 9 corresponding to the range of $21\Omega$ to $40\Omega$, for example. The pressure threshold level is a standard used to determine whether a press action of the user on the resistive touch panel 10 is too forceful. In one embodiment, the pressure threshold level may be preset to 5.

The obtaining module 202 obtains parameter values of the resistive touch panel 10 and location information of a touch point in response to receiving press signals of a press action on the resistive touch panel 10. In one embodiment, the parameter values comprises the internal parameters Z1 and Z2 of the resistive touch panel 10, the total resistance Rx between the two electrodes X+ and X−. The location information of the touch point represents the value of the X coordinate of the touch point. Details will be provided below.

In one embodiment, the resistive touch panel 10 can be constructed of glass and film. The adjacent sides of the glass and film can be both coated with Indium Tin Oxide (ITO) coatings. When the user touches the resistive touch panel 10, a sensor of the resistive touch panel 10 sends corresponding electric signals (e.g., the press signals) through conversion circuitry to the processor 50, and then coordinates of the touch point are acquired using the processor 50.

Figure 3:
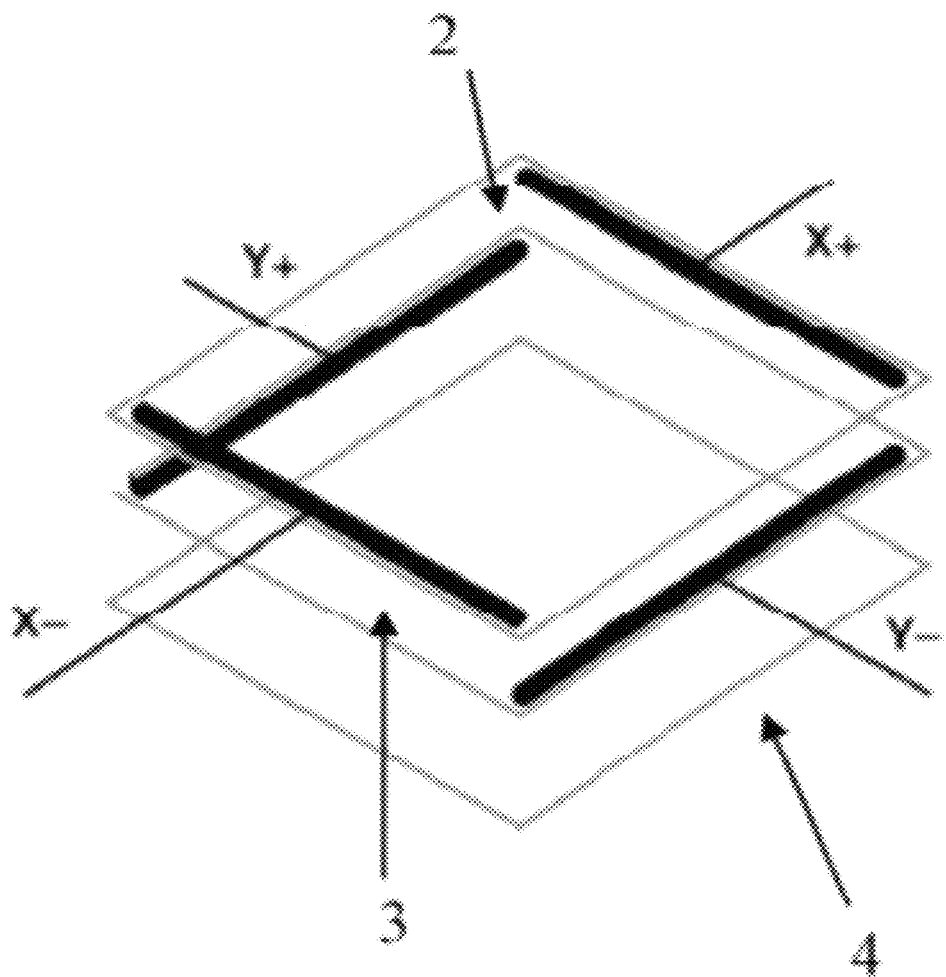
FIG. 3 is a schematic diagram of one embodiment of a four-wire resistive touch panel.

As shown in FIG. 3, a four-wire resistive touch panel includes an upper ITO layer 2, an underlying ITO layer 3, and a substrate 4, for example. The substrate 4 can be glass or acrylic, depending on the embodiment. The substrate 4 is covered with two conductive ITO layers, such as X electrodes and Y electrodes. The positive and negative ends of the X electrodes and Y electrodes are educed by "conductive section" (see four black bars in FIG. 3) from both ends of the X electrodes and Y electrodes. And the conductive sections of the X electrodes and Y electrodes are perpendicular to each other. The educed positive and negative ends are represented as X−, X+, Y−, and Y+.

When a finger or a stylus presses on the surface of the resistive touch panel 10, the upper ITO layer 2 deforms and contacts the underlying ITO layer 3. The two conductive layers of the resistive touch panel 10 are equivalent to two working faces of the resistive touch panel 10. The conductive sections of the two ends of each working face are regarded as electrodes of the working face, such as the X− and X+ are one pair of electrodes, for example. The X coordinate of a touch point may be calculated according to a voltage generated on the X+ electrode, grounding X-electrode and Y+ being as the educe end to measure, and the voltage of the touch point is obtained. Due to the uniform conductive ITO layer, the ratio between the voltage of the touch point and the generated voltage is equal to a ratio between X coordinate of the touch point and the width of the resistive touch panel 10. The Y coordinate is similarly obtained. The measured voltage is converted into digital signals using ADC (Analog to Digital Conversion), so as to determine the location of the touch point.

Figure 4:
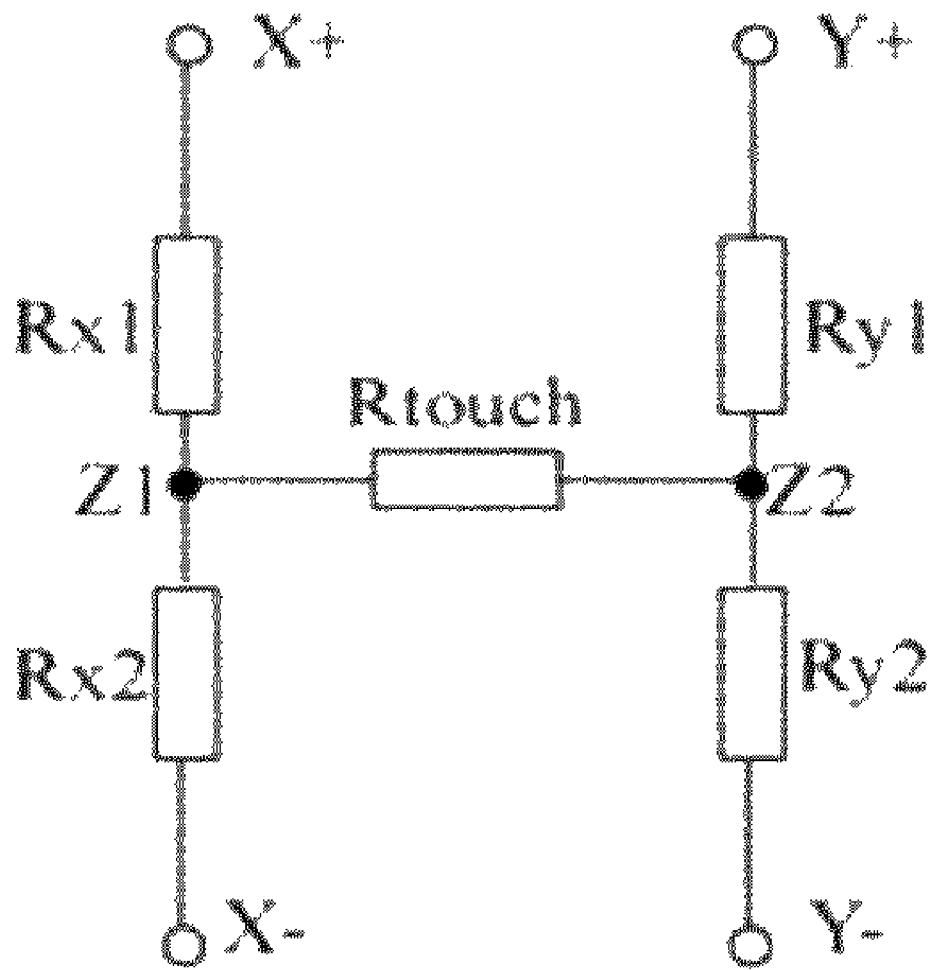
FIG. 4 is an equivalent circuit schematic diagram of one embodiment of a four-wire resistive touch panel of FIG. 3.

In addition, there is existing resistance at the touch point which is represented as a touch resistance (Rtouch). The greater the pressure and area of contact of a touch on the resistive touch panel 10, then the smaller the resistance at that point. The pressure may be quantified by measuring the resistance, the equivalent circuit is shown in FIG. 4.

In this disclosure, the calculation formula of the Rtouch is: Rtouch=Rx*($ADC_x$/4096)*(Z2/Z1−1). For a specified touch panel, Rx is a predetermined parameter value. $ADC_X$ which represents the X coordinate of the touch point means the value output by the ADC of 12-bit. X coordinate value of touch-point is calculated by grounding X− as shown in FIG. 2, X+ connecting power, Y+ connecting the ADC. Z1 and Z2 are internal parameters of the touch panel. As shown in FIG. 4, Z1 is calculated by grounding X−, connecting Y+ to power, and connecting X+ to the ADC. Z2 is calculated by grounding X− in FIG. 2, connecting Y+ to power, and connecting Y− to the ADC. In one embodiment, "4096" represents measurement grades of ADC to 12-bit precision.

According to the obtained parameter values of the resistive touch panel 10 and the coordinates of the touch point, the calculation module 204 calculates a resistance value of the touch resistance on the resistive touch panel 10 using the formula of "Rtouch=Rx*($ADC_x$/4096)*(Z2/Z1−1)."

According to the pressure level corresponding to the each resistance value of the touch resistance, the confirmation module 206 confirms a pressure level corresponding to a range of the calculated resistance value. For example, the pressure level corresponding to the resistance values from the range of 21 to 40Ω is 9 and the pressure level corresponding to the resistance values from the range of 0 to 20Ω is 10. If the calculated resistance value of a touch resistance is 25Ω, the confirmation module 206 confirms that the calculated resistance value of the touch resistance 25Ω is in the range of 21 to 40, and then confirms the corresponding pressure level is 9.

The determination module 208 determines whether the confirmed pressure level is lower than the pressure threshold level.

When the confirmed pressure level is not lower than the pressure threshold level, the processing module 210 outputs alerts using the alarm unit 30 to prompt that the press action on the resistive touch panel is too forceful.

Figure 5:
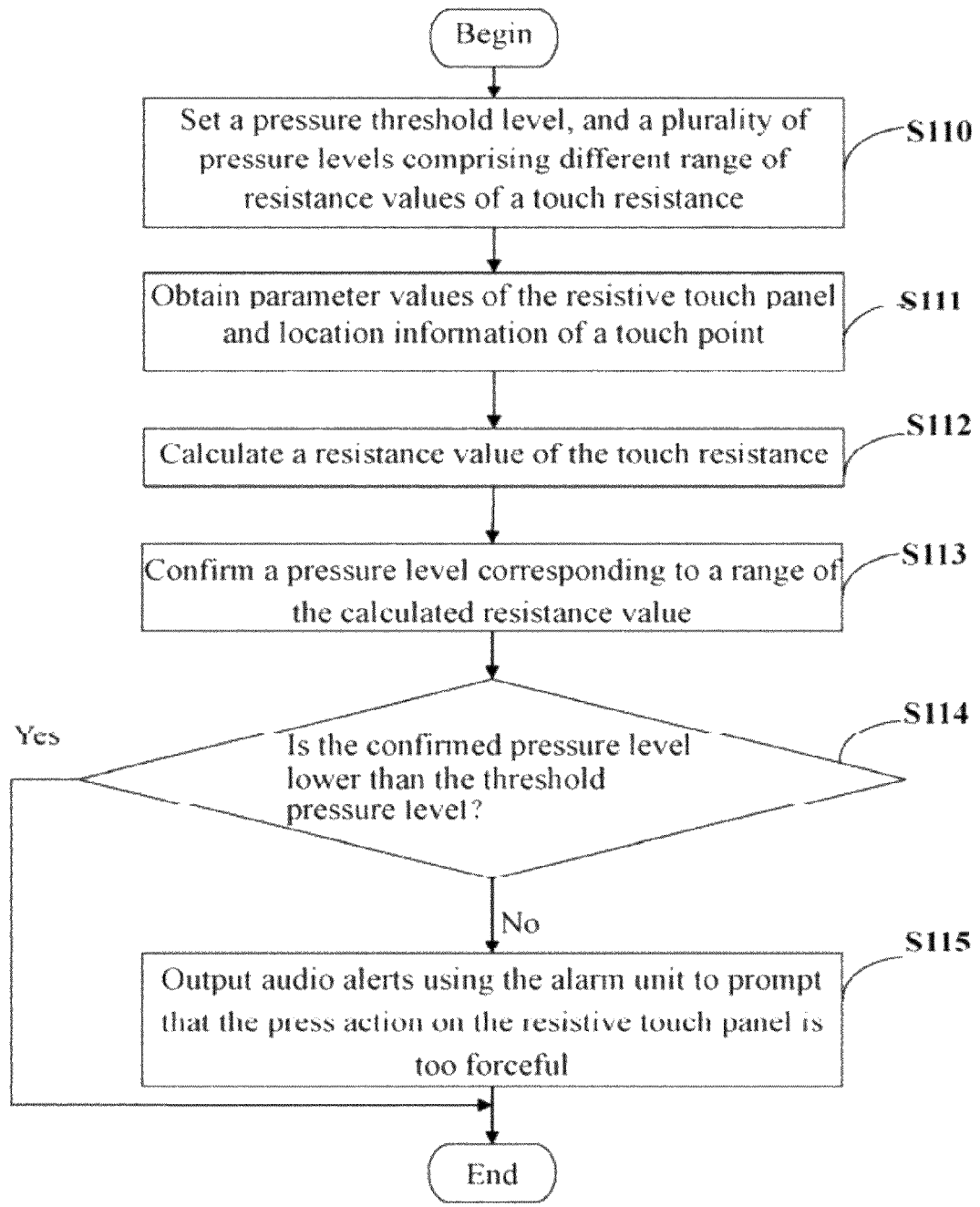
FIG. 5 is a flowchart of one embodiment of a method for protecting a resistive touch panel of the communication device of FIG. 1.

FIG. 5 is a flowchart of one embodiment of a method for protecting a resistive touch panel of a communication device of FIG. 1. Depending on the embodiment, additional blocks may be added, others removed, and the ordering of the blocks may be changed.

In block S110, the setting module 200 sets a priority of an audio alerts of the alarm unit 30, a plurality of pressure levels comprising different range of resistance values of a touch resistance, and a pressure threshold level.

In block S111, when receiving press signals of a press action from the resistive touch panel 10, the obtaining module 202 obtains parameter values of the resistive touch panel 10 and location information of a touch point. The parameter values comprises the internal parameters Z1 and Z2 of the resistive touch panel 10, the total resistance Rx between the two electrodes X+ and X−. The location information of the touch point represents the value of the X coordinate of the touch point.

In block S112, according to the obtained parameter values of the resistive touch panel 10 and the location information of the touch point, the calculation module 204 calculates a resistance value of the touch resistance on the resistive touch panel 10 using the formula of "Rtouch=Rx*($ADC_x$/4096)*(Z2/Z1−1)."

In block S113, according to the pressure level corresponding to the each resistance value of the touch resistance, the confirmation module 206 confirms a pressure level corresponding to a range of the calculated resistance value.

In block S114, the determination module 208 determines whether the confirmed pressure level is lower than the pressure threshold level. If the confirmed pressure level is not lower than the pressure threshold level, then the procedure turns to block S115. If the confirmed pressure level is lower than the pressure threshold level, then the procedure is end.

In block S115, the processing module 210 outputs audio alerts using the alarm unit 30 to prompt that the press action on the resistive touch panel is too forceful.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be comprised herein within the scope of this disclosure and the above-described inventive embodiments, and the present disclosure is protected by the following claims.

What is claimed is:

1. A method for protecting a resistive touch panel of a communication device, the method comprising:

setting a plurality of pressure levels comprising different range of resistance values of a touch resistance, setting a pressure threshold level, and setting a priority of audio alerts of an alarm unit of the communication device;

obtaining parameter values of the resistive touch panel and location information of a touch point on the resistive touch panel in response to receiving press signals of a press action from the resistive touch panel;

calculating a resistance value of the touch resistance on the resistive touch panel according to the obtained parameter values and the location information;

confirming a pressure level corresponding to a range of the calculated resistance value;

determining whether the confirmed pressure level is lower than the pressure threshold level; and outputting the audio alerts using the alarm unit to prompt that the press action on the resistive touch panel is too forceful, if the confirmed pressure level is not lower than the pressure threshold level.

2. The method as described in claim 1, wherein the priority of the audio alerts is higher than the priority of a voice prompt given in response to touch on the resistive touch panel.

3. The method as described in claim 1, wherein the pressure threshold level is a standard to determine whether a press action on the resistive touch panel is too forceful.

4. The method as described in claim 1, wherein the alarm unit comprises a speaker.

5. A non-transitory computer readable storage medium storing a set of instructions, the set of instructions capable of being executed by a processor to perform a method for protecting a resistive touch panel of a communication device, the method comprising:
- setting a plurality of pressure levels comprising different range of resistance values of a touch resistance, setting a pressure threshold level, and setting a priority of audio alerts of an alarm unit of the communication device;
- obtaining parameter values of the resistive touch panel and location information of a touch point on the resistive touch panel in response to receiving press signals of a press action from the resistive touch panel;
- calculating a resistance value of the touch resistance on the resistive touch panel according to the obtained parameter values and the location information;
- confirming a pressure level corresponding to a range of the calculated resistance value;
- determining whether the confirmed pressure level is lower than the pressure threshold level; and
- outputting the audio alerts using the alarm unit to prompt that the press action on the resistive touch panel is too forceful, if the confirmed pressure level is not lower than the pressure threshold level.

6. The storage medium as described in claim 5, wherein the priority of the audio alerts is higher than the priority of a voice prompt given in response to touch on the resistive touch panel.

7. The storage medium as described in claim 5, wherein the pressure threshold level is a standard to determine whether a press action on the resistive touch panel is too forceful.

8. The storage medium as described in claim 5, wherein the alarm unit comprises a speaker.

9. A system for protecting a resistive touch panel of a communication device, the system comprising:
- a storage device;
- at least one processor; and
- one or more programs stored in the storage device and being executable by the at least one processor, the one or more programs comprising:
  - a setting module operable to set a plurality of pressure levels comprising different range of resistance values of a touch resistance, and set a pressure threshold level;
  - the setting module further operable to set a priority of audio alerts of an alarm unit of the communication device;
  - an obtaining module operable to obtain parameter values of the resistive touch panel and location information of a touch point in response to receiving press signals of a press action from the resistive touch panel;
  - a calculation module operable to calculate a resistance value of the touch resistance on the resistive touch panel according to the obtained parameter values and the location information;
  - a confirmation module operable to confirming a pressure level corresponding to a range of the calculated resistance value;
  - a determination module operable to determine whether the confirmed pressure level is lower than the pressure threshold level; and
  - a processing module operable to output the audio alerts using alarm unit to prompt that the press action on the resistive touch panel is too forceful, if the confirmed pressure level is not lower than the pressure threshold level.

10. The system as described in claim 9, wherein the priority of the audio alerts is higher than the priority of a voice prompt given in response to touch on the resistive touch panel.

11. The system as described in claim 9, wherein the pressure threshold level is a standard to determine whether a press action on the resistive touch panel is too forceful.

12. The system as described in claim 9, wherein the alarm unit comprises a speaker.

* * * * *